(12) United States Patent
Kamioka et al.

(10) Patent No.: US 9,283,855 B2
(45) Date of Patent: Mar. 15, 2016

(54) POWER MANAGEMENT APPARATUS, POWER MANAGEMENT METHOD, AND POWER MANAGEMENT SYSTEM

(75) Inventors: Nozomu Kamioka, Chiyoda-ku (JP); Satoshi Wachi, Chiyoda-ku (JP); Yasukazu Murata, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 805 days.

(21) Appl. No.: 13/479,954

(22) Filed: May 24, 2012

(65) Prior Publication Data

US 2013/0119759 A1  May 16, 2013

(30) Foreign Application Priority Data

Nov. 10, 2011  (JP) .................. 2011-246238

(51) Int. Cl.
| | |
|---|---|
| B60L 1/00 | (2006.01) |
| B60L 3/00 | (2006.01) |
| H02G 3/00 | (2006.01) |
| B60L 11/14 | (2006.01) |
| B60R 16/03 | (2006.01) |

(52) U.S. Cl.
CPC .............. *B60L 11/14* (2013.01); *B60R 16/03* (2013.01); *Y02T 10/70* (2013.01); *Y02T 10/7077* (2013.01)

(58) Field of Classification Search
CPC ....... B60L 1/00; B60L 11/14; Y02T 10/7077; B60R 16/03
USPC .............. 307/10.1, 9.1; 180/65, 285; 903/903
See application file for complete search history.

(56) References Cited

U.S. PATENT DOCUMENTS

| | | | | |
|---|---|---|---|---|
| 6,668,963 | B2 * | 12/2003 | Nada .............................. | 180/279 |
| 7,486,034 | B2 * | 2/2009 | Nakamura et al. ............ | 318/139 |
| 8,013,548 | B2 * | 9/2011 | King et al. ..................... | 318/139 |
| 8,508,066 | B2 * | 8/2013 | Lee et al. ....................... | 307/9.1 |
| 8,643,346 | B2 * | 2/2014 | Foerster et al. ............... | 323/225 |
| 2004/0084965 | A1 * | 5/2004 | Welches et al. ................ | 307/64 |

(Continued)

FOREIGN PATENT DOCUMENTS

| | | |
|---|---|---|
| DE | 102008031270 A1 | 1/2010 |
| JP | 08-214409 A | 8/1996 |

(Continued)

OTHER PUBLICATIONS

Preliminary Notice of Reasons for Rejection, dated Mar. 19, 2013, JPA No. 2011-246238.

(Continued)

*Primary Examiner* — Jared Fureman
*Assistant Examiner* — Esayas Yeshaw
(74) *Attorney, Agent, or Firm* — Sughrue Mion, PLLC; Richard C. Turner

(57) ABSTRACT

The power management apparatus provided in a vehicle includes: a switch 6 for bringing a state between the first and second electric power storage devices 1 and 2 into a non-conduction state during a normal operation and switching the state therebetween to a conduction state when a failure of the power converter 4 is detected; and a power management section 7 for controlling the motor-generator 3 so that a difference between voltages of the first and second electric power storage devices 1 and 2 is equal to or smaller than a predetermined voltage difference before the switch 6 is operated to perform switching from the non-conduction state to the conduction state.

12 Claims, 4 Drawing Sheets

(56) References Cited

U.S. PATENT DOCUMENTS

| | | | |
|---|---|---|---|
| 2010/0100264 A1* | 4/2010 | Kato | 701/22 |
| 2011/0066331 A1* | 3/2011 | Yamashita | 701/42 |
| 2011/0087395 A1* | 4/2011 | Yamamoto et al. | 701/22 |
| 2011/0095603 A1 | 4/2011 | Lee et al. | |

FOREIGN PATENT DOCUMENTS

| | | | |
|---|---|---|---|
| JP | 11-122701 A | 4/1999 | |
| JP | 4143267 B2 | 9/2008 | |
| JP | 2010-172155 A | 8/2010 | |
| JP | 2011-189813 A | 9/2011 | |

OTHER PUBLICATIONS

Communication dated Dec. 16, 2015 from the German Patent Office issued in corresponding application No. 102012212200.1.

\* cited by examiner

POWER MANAGEMENT APPARATUS, POWER MANAGEMENT METHOD, AND POWER MANAGEMENT SYSTEM

BACKGROUND OF THE INVENTION

1. Field of the Invention

The present invention relates to a power management apparatus, a power management method, and a power management system, in particular, a power management apparatus, a power management method, and a power management system, which are used in a vehicle including a plurality of electric power storage devices and a power converter.

2. Description of the Related Art

Against the background of greenhouse effect gas issues of the earth, a technology of reducing a fuel consumption of an automobile is desired to be developed. Under such circumstances, a technology of recovering kinetic energy generated at the time of deceleration as power and reducing the amount of power generation at the time other than the deceleration so as to reduce a fuel consumption of a vehicle has been developed. If a voltage of a power generator is increased in the vehicle as described above, the generated power can be more efficiently stored. Therefore, power can be generated and stored at a voltage higher than a voltage region in which electric apparatuses of an engine are operated. Moreover, if power at a pressure lowered with use of a power converter is supplied to the electric apparatuses and a battery, the power can be efficiently used. In the system described above, however, if a failure occurs in the power converter, power cannot be supplied from a high-voltage circuit to a low-voltage circuit. Therefore, the power is supplied to the electric apparatuses only from the battery. When the amount of charge of the battery decreases, the electric apparatuses do not operate. In the worst cases, the vehicle cannot run.

As a conventional power management device for a vehicle, a system including two power converters in preparation for a failure of any one of the power converters has been proposed (for example, Japanese Patent Application Laid-open No. Hei 11-122701 (page 5, FIG. 1)).

A system for reducing the amount of power generated by the power generator so that an output voltage becomes approximately equal to that of the low-voltage circuit and supplying power to the low-voltage circuit when a short-circuit fault occurs between the high-voltage circuit and the low-voltage circuit has been proposed (for example, Japanese Patent No. 4143267 (page 5, FIG. 1)).

The conventional power management apparatus described in Japanese Patent Application Laid-open No. Hei 11-122701 has a configuration in which the two power converters are connected in parallel in preparation for a failure of any one of the power converters. Therefore, cost is remarkably increased with the dual-system configuration. In addition, there arises a problem of increased size.

Further, the another conventional power management device described in Japanese Patent No. 4143267 reduces the amount of power generated by the power generator so that the output voltage becomes approximately equal to that of the low-voltage circuit and performs control so that the power is supplied to the low-voltage circuit when the short-circuit fault occurs between the high-voltage circuit and the low-voltage circuit. In the case of a general failure with which the high-voltage circuit and the low-voltage circuit are not short-circuited by the power converter, however, a problem of the stop of power supply to the low-voltage remains unsolved.

SUMMARY OF THE INVENTION

The present invention has been made to solve the problems described above and therefore, has an object to provide a power management apparatus, a power management method, and a power management system, which can supply power from a high-voltage circuit to a low-voltage circuit even when a failure occurs in a power converter and enable a vehicle to continuously run in a stable manner without stopping operations of electric apparatuses of the vehicle.

The present invention provides a power management apparatus provided in a vehicle including: a first circuit including a first electric power storage device; a second circuit including a second electric power storage device; a power converter for converting power of the first electric power storage device to supply the converted power to the second electric power storage device and an electric apparatus of the vehicle; and a motor-generator connected to the first electric power storage device. The power management apparatus includes: a switch connected between the first circuit and the second circuit, for bringing a state between the first circuit and the second circuit into a non-conduction state during a normal operation and switching the state between the first circuit and the second circuit from the non-conductive state to a conduction state when a failure of the power converter is detected; and a power management section for controlling the motor-generator so that a difference between a voltage of the first electric power storage device and a voltage of the second electric power storage device is equal to or smaller than a first predetermined voltage difference before the switch is operated to switch the state between the first circuit and the second circuit from the non-conduction state to the conduction state.

The present invention provides the power management apparatus provided in the vehicle including: the first circuit including the first electric power storage device; the second circuit including the second electric power storage device; the power converter for converting power of the first electric power storage device to supply the converted power to the second electric power storage device and the electric apparatus of the vehicle; and the motor-generator connected to the first electric power storage device, the power management apparatus including: the switch connected between the first circuit and the second circuit, for bringing the state between the first circuit and the second circuit into a non-conduction state during a normal operation and switching the state between the first circuit and the second circuit from the non-conductive state to the conduction state when the failure of the power converter is detected; and the power management section for controlling the motor-generator so that the difference between the voltage of the first electric power storage device and the voltage of the second electric power storage device is equal to or smaller than the first predetermined voltage difference before the switch is operated to switch the state between the first circuit and the second circuit from the non-conduction state to the conduction state. Therefore, it is possible to supply power from the high-voltage circuit to the low-voltage circuit even when the failure occurs in the power converter and enable the vehicle to continuously run in a stable manner without stopping the operations of the electric apparatuses of the vehicle.

DETAILED DESCRIPTION OF THE PREFERRED EMBODIMENT

First Embodiment

Figure 1:
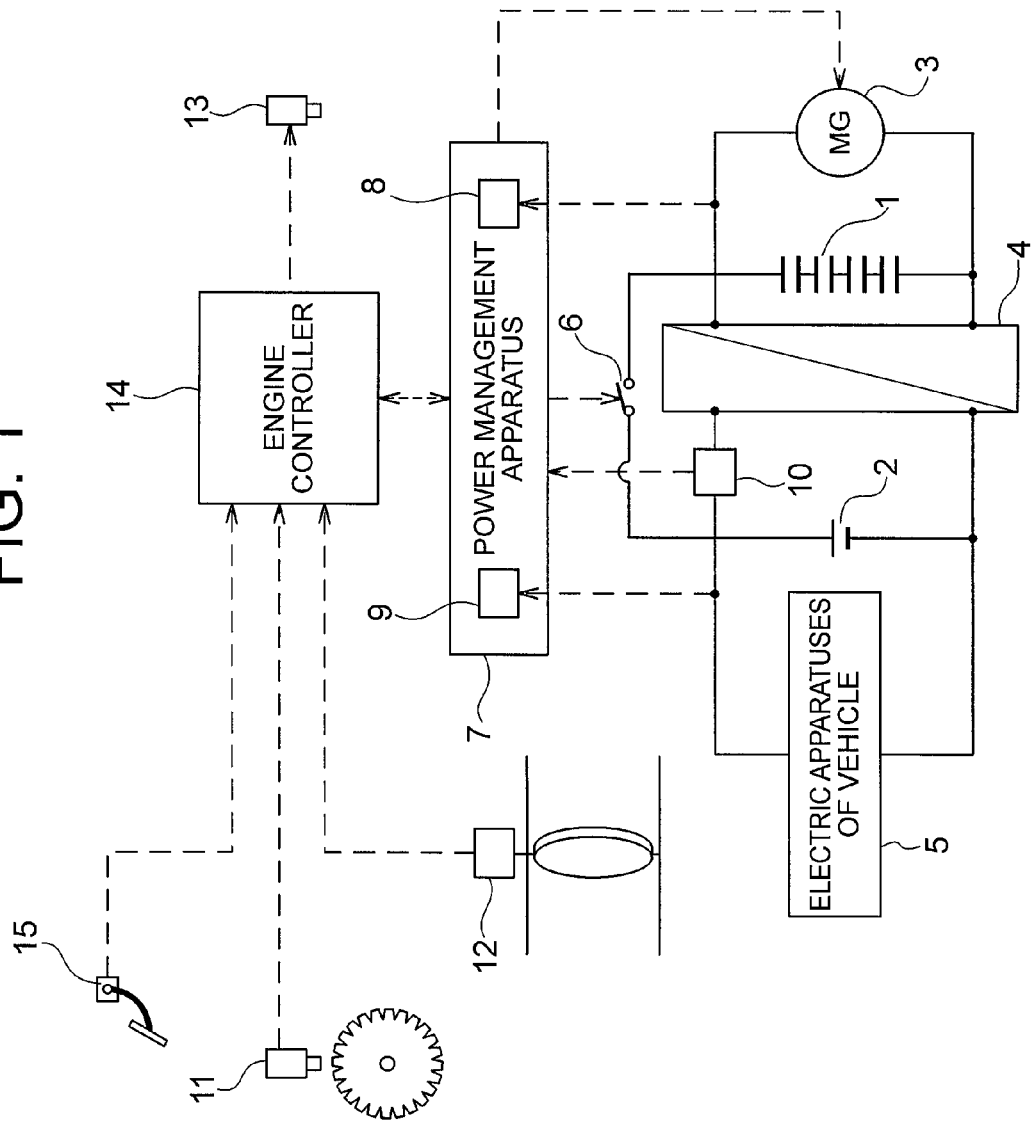
FIG. 1 is a configuration diagram illustrating a configuration of a power management apparatus according to a first embodiment of the present invention and the periphery thereof.
Figure 2:
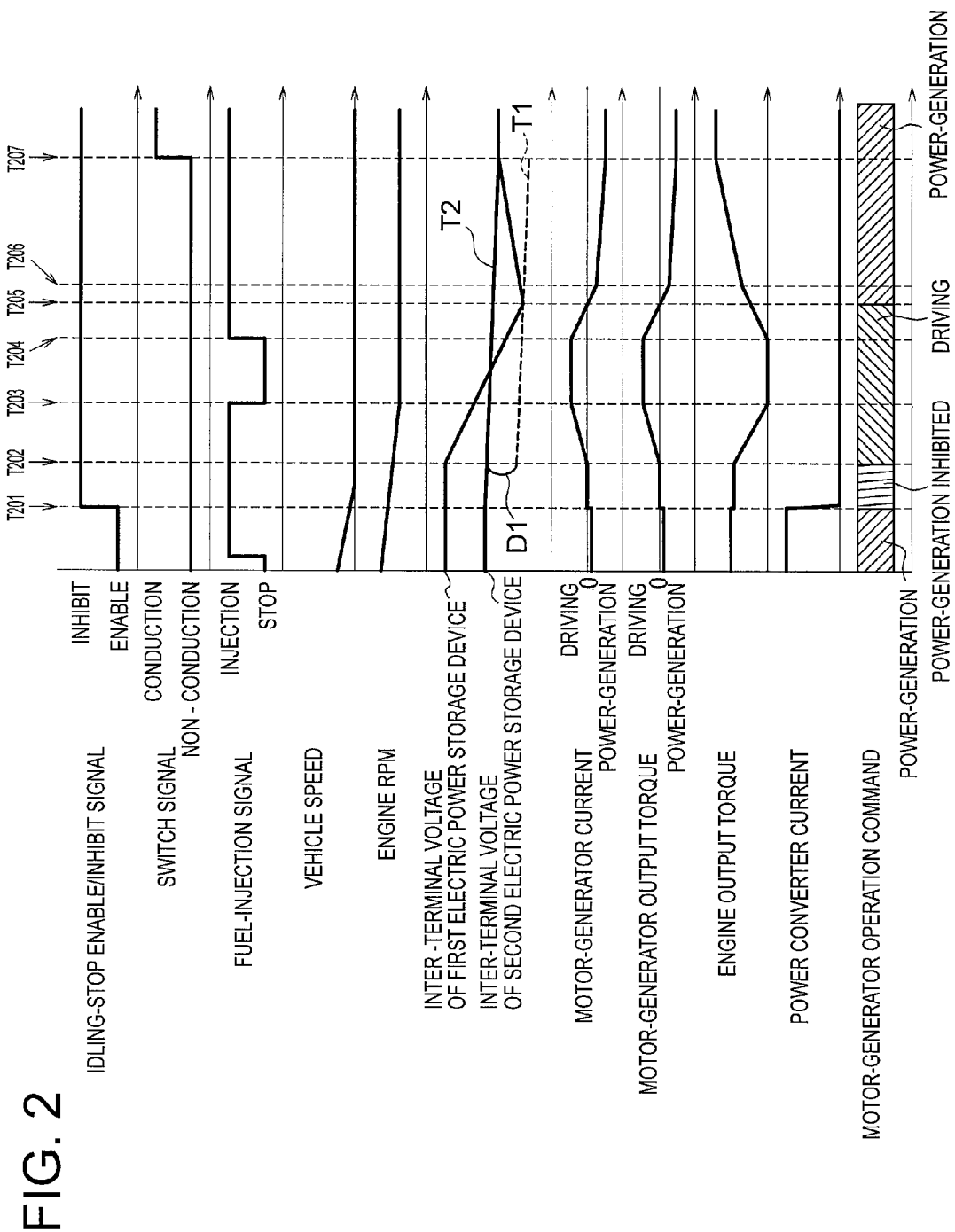
FIG. 2 is a time chart illustrating operations of the power management apparatus according to the first embodiment of the present invention and the periphery thereof.

A power management apparatus and a power management method according to a first embodiment of the present invention are described referring to FIGS. 1 to 3. In FIGS. 1 to 3, the same or equivalent parts are denoted by the same reference numerals, and the overlapping description thereof is herein omitted.

FIG. 1 is a configuration diagram illustrating a configuration of the power management apparatus according to the first embodiment of the present invention and the periphery thereof. The entire configuration illustrated in FIG. 1 is provided in a vehicle. As illustrated in FIG. 1, a first electric power storage device 1 and a second electric power storage device 2 are provided. The first electric power storage device 1 and the second electric power storage device 2 can be charged and discharged by electric devices respectively connected to the first electric power storage device 1 and the second electric power storage device 2. The first electric power storage device 1 is a high-voltage type electric power storage device, whereas the second electric power storage device 2 is a low-voltage type electric power storage device. Power is stored in the first electric power storage device 1 by a motor-generator 3 described below. The first electric power storage device 1 converts power through an intermediation of a power converter 4 described below, and supplies to the second electric power storage device 2 and electric apparatuses 5 of the vehicle, described below. The second electric power storage device 2 and the electric apparatuses 5 of the vehicle are included in the low-voltage circuit.

The vehicle runs using an engine (not shown) as motive power. An output of the engine is controlled by an engine controller 14. Engine-rpm (Engine revolution/rotation per minute) detecting means 11, throttle opening-degree detecting means 12, and accelerator opening-degree detecting means 15 are connected to the engine controller 14. The engine-rpm detecting means 11 detects an engine rpm. The throttle opening-degree detecting means 12 detects a throttle opening-degree. The accelerator opening-degree detecting means 15 detects an opening-degree of an accelerator pedal operated in response to an acceleration request by a driver. Signals from the engine-rpm detecting means 11, the throttle opening-degree detecting means 12, and the accelerator opening-degree detecting means 15 are input to the engine controller 14. The engine controller 14 calculates a necessary engine output based on information of the signals and a request torque from each system. The engine controller 14 thus commands an injector 13 to inject a fuel.

As illustrated in FIG. 1, the motor-generator 3 is provided. The motor-generator 3 is connected to the first electric power storage device 1. The motor-generator 3 has a driving mode and a power-generation mode. In the driving mode, the motor-generator 3 uses the power stored in the first electric power storage device 1 to apply a torque to the engine so as to start the engine. In the power-generation mode, the motor-generator 3 is applied with the torque by the engine to charge the first electric power storage device 1. The electric apparatuses 5 of the vehicle are a plurality of auxiliary apparatuses provided to the vehicle. Examples of the electric apparatuses 5 are, for example, electric devices such as headlights, air conditioners, audio devices, and control units for controlling the engine and power windows. The power converter 4 is provided. The power converter 4 is a DC-DC converter or the like. The power converter 4 converts the power generated by the motor-generator 3 and stored in the first electric power storage device 1 into a voltage smaller than a voltage of the first electric power storage device 1 so as to supply the obtained voltage to the second electric power storage device 2 and the electric apparatuses 5 of the vehicle. A switch 6 is connected between a high-voltage circuit and a low-voltage circuit. The high-voltage circuit includes the motor-generator 3 and the first electric power storage device 1, whereas the low-voltage circuit includes the second electric power storage device 2 and the electric apparatuses 5 of the vehicle. The switch 6 performs switching between a conduction state and a non-conduction state between the high-voltage circuit and the low-voltage circuit. A power management section 7 makes a command for power generation or driving to the motor-generator 3 and a command for a torque when the motor-generator 3 is operated in the power-generation mode and the driving mode. The power management section 7 commands the switch 6 to operate to achieve the non-conduction state during a normal operation and commands the switch 6 to operate to achieve the conduction state when a failure of the power converter 4 is detected. The power management section 7 includes inter-terminal voltage detecting means 8 for the first electric power storage device 1, for detecting a voltage between terminals of the first electric power storage device 1, and inter-terminal voltage detection means 9 for the second electric power storage device 2, for detecting a voltage between terminals of the second electric power storage device 2. The voltage between the terminals of the first electric power storage device 1 and the voltage between the terminals of the second electric power storage device 2 can be respectively measured by the inter-terminal voltage detecting means 8 and the inter-terminal voltage detecting means 9. Power-converter output-current detecting means 10 is connected between the power converter 4 and the second electric power storage device 2 so that an output current of the power converter 4 can be measured. The power management section 7 and the engine controller 14 have communication functions and hence, can share information used for control by each of the power management section 7 and the engine controller 14.

The power management apparatus according to the first embodiment of the present invention includes the power management section 7 and the switch 6. A power management system according to the first embodiment of the present invention includes the first electric power storage device 1, the second electric power storage device 2, the power converter 4, the motor-generator 3, the switch 6, and the power management section 7.

FIG. 2 is a time chart of the power management apparatus and the power management system according to the first embodiment of the present invention. A horizontal axis of the graph is a time axis. A vertical axis indicates, in the stated order from the uppermost row, an idling-stop enable/inhibit signal generated in the power management section 7, a switch signal for operating the switch 6 to perform switching between the conduction state and the non-conduction state between the high-voltage circuit and the low-voltage circuit, a fuel injection signal indicating whether or not fuel injection is to be performed from the injector 13, a vehicle speed detected by a vehicle-speed sensor (not shown), an engine rpm detected by the engine-rpm detecting means 11, the inter-terminal voltage of the first electric power storage device 1, detected by the inter-terminal detecting means 8 for the first electric power storage device 1, the inter-terminal voltage of the second electric power storage device 2, detected by the inter-terminal detecting means 9 for the second electric power storage device 2, a current of the motor-generator 3, an output torque of the motor-generator 3, an output torque of the engine, an output current of the power converter 4, and an operation command to the motor-generator 3.

As illustrated in FIG. 2, when the motor-generator 3 is operated in the driving mode, the power is consumed and the current of the motor-generator 3 has a value which becomes larger in an upward direction of the axis. When the motor-generator 3 is operated in the power-generation mode, the power is stored and the current of the motor-generator 3 has a value which becomes larger in a downward direction of the axis. Similarly, the output torque of the motor-generator 3 has a value which becomes larger in the upward direction of the axis when the motor-generator 3 is operated in the driving mode. The output torque of the motor-generator 3 has a value which becomes larger in the downward direction of the axis when the motor-generator 3 is operated in the power-generation mode.

In FIG. 2, an example is described, for the simplification of description, in which a failure occurs in the power converter 4 during moderate deceleration and then idling is continued. Note that, the time chart is used for illustrating the operation principles of the present invention, and the present invention is not limited to the operation described above.

In FIG. 2, T1 is a first target voltage, and T2 is a second target voltage. The current and torque characteristics of the motor-generator 3 are merely examples, and are not limited to the characteristics illustrated in FIG. 2. FIG. 2 is merely an example, and the scales of the vertical axis indicating information such as the current, the voltage, and the torque are not necessarily identical.

As is illustrated in FIG. 2, before time t=T201, the power converter 4 operates normally as can be understood from a value of the output current of the power converter 4. Moreover, as the vehicle speed indicates, the vehicle speed decelerates moderately, and the engine rpm is gradually reduced to be closer to a predetermined idling rpm. The motor-generator 3 operates in the power-generation state and therefore, the power is supplied to the second electric power storage device 2 and the electric apparatuses 5 of the vehicle through an intermediation of the power converter 4. The first electric power storage device 1 and the second electric power storage device 2 are in a fully-charged state and therefore, each of the inter-terminal voltages of the first electric power storage device 1 and the second electric power storage device 2 keeps a constant value. As the current of the motor-generator 3, only the amount of current corresponding to the amount of power for driving the electric apparatuses 5 of the vehicle, which are connected to the power converter 4, flows. As a power-generation torque of the motor-generator 3, a torque corresponding to the amount of generated current is applied from the engine. As the output torque of the engine, the amount of torque necessary for rotating the engine itself and torque necessary for power generation is generated. The power converter 4 operates normally and outputs a current necessary for driving the electric apparatuses 5 of the vehicle to the low-voltage circuit.

At time t=T201, a failure occurs in the power converter 4 for some reason. Then, the output current of the power converter 4 is lowered and then becomes zero. The power management section 7 detects the failure of the power converter 4 based on a detected current value from the power-converter output-current detecting means 10. The power supply from the high-voltage circuit is stopped. Therefore, the power is now supplied to the electric apparatuses 5 of the vehicle from the second electric power storage device 2. As a result, the voltage of the second electric power storage device 2 is gradually lowered. When the voltage of the second electric power storage device 2 becomes equal to or smaller than a predetermined value, the electric apparatuses 5 of the vehicle cannot be driven. Therefore, there is a risk in that the vehicle cannot run. In view of such a risk, the power supply to the second electric power storage device 2 and the electric apparatuses 5 of the vehicle is desired to be restarted as quickly as possible. Therefore, when detecting the failure in the power converter 4, the power management section 7 transmits an inhibit signal for inhibiting idling stop to the engine controller and outputs a power-generation inhibit command to the motor-generator 3 as a motor-generator operation command. As a result, the generated current by the motor-generator 3 and the power-generation torque are lowered to become zero.

At time t=T202, the power management section 7 starts processing for lowering the voltage of the first electric power storage device 1. The power management section 7 starts computing the first target voltage T1. A value D1 illustrated in FIG. 2 is a maximum value of a voltage drop occurring between the motor-generator 3 and the first electric power storage device 1 while the motor-generator 3 is driven, and is prestored in the power management section 7. Therefore, the power management section 7 uses the value of D1 to calculate the first target voltage T1. More specifically, the power management section 7 obtains, by a computation, a value obtained by subtracting D1 from the inter-terminal voltage of the second electric power storage device 2 as the first target voltage T1. Simultaneously, the power management section 7 issues a driving command to the motor-generator 3 as the motor-generator operation command. A driving torque of the motor-generator 3 is gradually increased by the driving command while a limit is set so that the inter-terminal voltage of the first electric power storage device 1 becomes equal to or smaller than the first target voltage T1 and a change amount in driving torque of the motor-generator 3 does not become equal to or larger than a predetermined voltage. The change amount is desired to be set to a maximum change amount which does not change a behavior of the engine or the vehicle by the driving torque generated by the motor-generator 3 so as to prevent a feeling of discomfort from being given to a driver. With an increase in driving torque, the current of the motor-generator 3 also increases. A ratio of the driving torque of the motor-generator 3 to a torque necessary to maintain the rotation of the engine becomes large. Therefore, the output torque of the engine becomes relatively smaller. The power stored in the first electric power storage device 1 is consumed by the motor-generator 3 and therefore, the inter-terminal voltage of the first electric power storage device 1 is gradually lowered.

At time t=T203, the engine rpm becomes smaller than a preset predetermined rpm. The predetermined rpm is set to an rpm at which the torque which can be output from the motor-generator 3 exceeds the torque necessary for the engine to maintain the rotation. In other words, in a region in which the engine rpm is smaller than the predetermined rpm, the rotation of the engine can be maintained by the motor-generator 3 alone. The power management section 7 commands the motor-generator 3 to output the torque for maintaining the engine rpm, and outputs the signal for commanding the stop of the fuel injection of the injector 13 to the engine controller 14 as the fuel injection signal. As a result, the output torque of the engine becomes zero.

At time t=T204, the inter-terminal voltage of the first electric power storage device 1 becomes close to the first target voltage T1. Therefore, the power management section 7 limits the driving torque of the motor-generator 3 for the motor-generator 3. As a result, the driving torque is gradually lowered. Moreover, the current of the motor-generator 3 becomes small. Further, the power management section 7 outputs a signal for commanding the fuel injection of the injector 13 to the engine controller 14 as the fuel injection signal. As a result, the engine starts the fuel injection, and the output torque of the engine becomes relatively large.

At time t=T205, the inter-terminal voltage of the first electric power storage device 1 reaches the first target voltage T1. The power management section 7 starts computing the second target voltage 12 based on the detected value from the inter-terminal voltage detecting means 9 for the second electric power storage device 2. The second target voltage T2 is set equal to the terminal voltage of the second electric power storage device 2. In response to the command from the power management section 7, the operation command to the motor-generator 3 is switched from the operation in the driving mode to the operation in the power-generation mode. The current of the motor-generator 3 changes from the driving (consumption) side to the power-generation (power-storage) side. The motor-generator 3 gradually increases the power-generation torque of the motor-generator 3 while a limit is set so that the inter-terminal voltage of the first electric power storage device 1 becomes equal to or larger than the second target voltage T2 and a change amount in power-generation torque of the motor-generator 3 does not become equal to or larger than a predetermined value. The change amount is desired to be set to a maximum change amount which does not change a behavior of the engine or the vehicle by the torque generated by the motor-generator 3 so as to prevent a feeling of discomfort from being given to the driver. With an increase in power-generation torque, the current of the motor-generator 3 increases toward the power-generation side. The motor-generator 3 is in the power-generation state and the first electric power storage device 1 is in the power-storage state. Therefore, the inter-terminal voltage of the first electric power storage device 1 gradually increases.

At time t=T206, the inter-terminal voltage of the first electric power storage device 1 becomes slightly closer to the second target voltage T2. Therefore, the power-generation torque of the motor-generator 3 is limited. The power is continuously supplied to the electric apparatuses 5 of the vehicle after the failure occurs in the power converter 4 and hence, the inter-terminal voltage of the second electric power storage device 2 continues decreasing.

At time t=T207, a voltage difference between the inter-terminal voltage of the first electric power storage device 1 and the inter-terminal voltage of the second electric power storage device 2, which corresponds to the second target voltage T2, becomes equal to or smaller than a predetermined voltage difference. The power management section 7 outputs the switch signal to the switch 6 so that the switch 6 is operated to switch the state between the high-voltage circuit and the low-voltage circuit from the non-conduction state to the conduction state. As a result, the switch 6 is operated to achieve the conduction state. As the current of the motor-generator 3, the amount of current necessary to maintain the voltage of the second electric power storage device 2 and current to be supplied to the electric apparatuses 5 of the vehicle is output. As the output torque of the motor-generator 3, a torque in accordance with the amount of power generated by the motor-generator 3 is applied by the engine. An output torque of the engine becomes equal to the sum of the power-generation torque of the motor-generator 3 and the torque necessary to maintain the rotation of the engine. The operation command to the motor-generator 3 is issued so that the power-generation state is continued even after the switch 6 is turned ON so that the power is supplied to the electric apparatuses 5 of the vehicle and the second electric power storage device 2.

As described above, in this embodiment, the switch 6 for performing switching between the non-conduction state and the conduction state between the high-voltage circuit and the low-voltage circuit is provided. When detecting the failure of the power converter 4, the power management section 7 operates the motor-generator 3 so that the voltage difference between the inter-terminal voltage of the first electric power storage device 1 of the high-voltage system and the inter-terminal voltage of the second electric power storage device 2 of the low-voltage system becomes equal to or smaller than the predetermined value before the switch 6 is operated to switch the state between the high-voltage circuit and the low-voltage circuit from the non-conduction state to the conduction state. As a result, even if the failure occurs in the power converter 4, the power can be supplied from the high-voltage circuit to the low-voltage circuit.

Figure 3A:
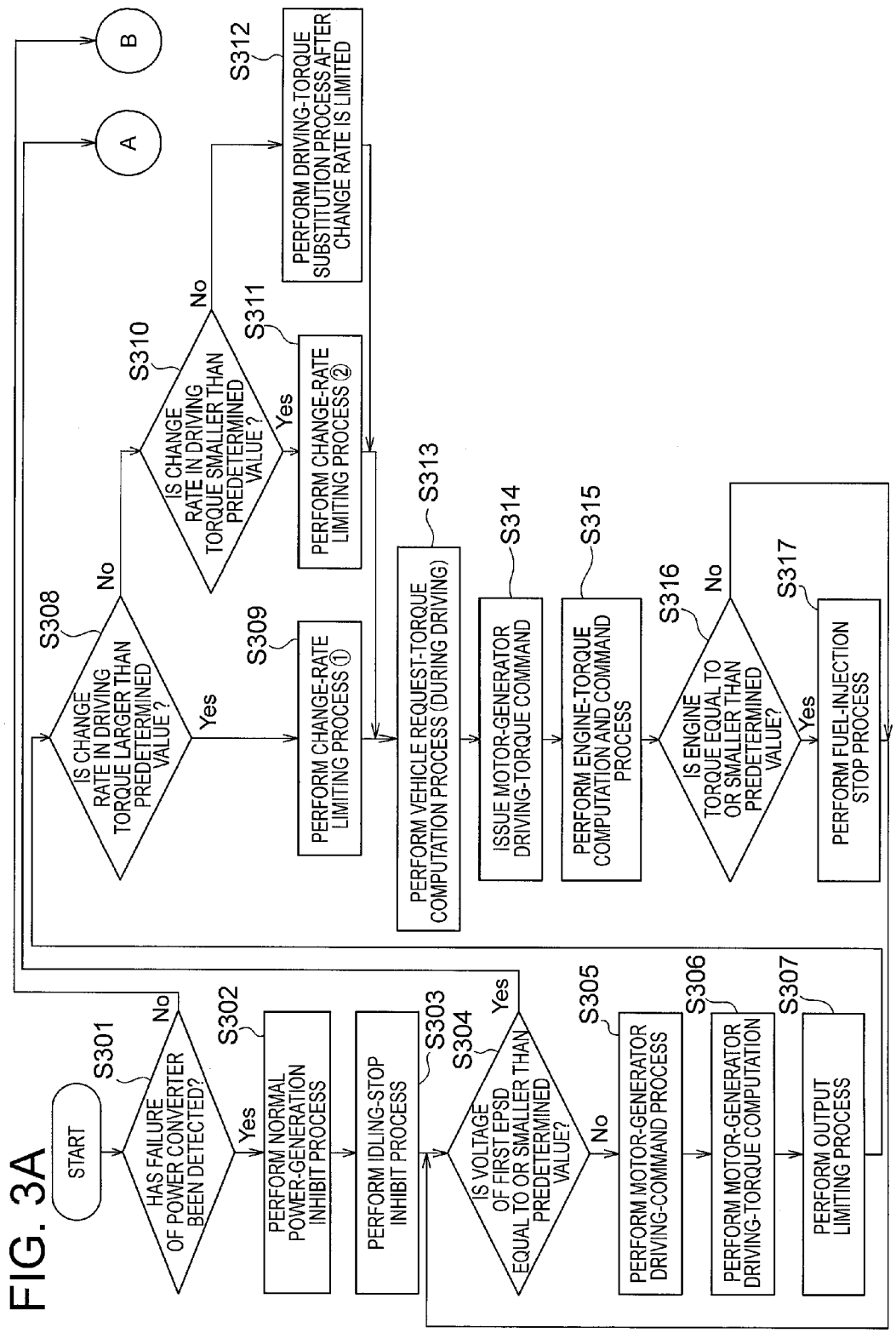
FIG. 3A is a flowchart illustrating a flow of processing performed by the power management apparatus according to the first embodiment of the present invention.
Figure 3B:
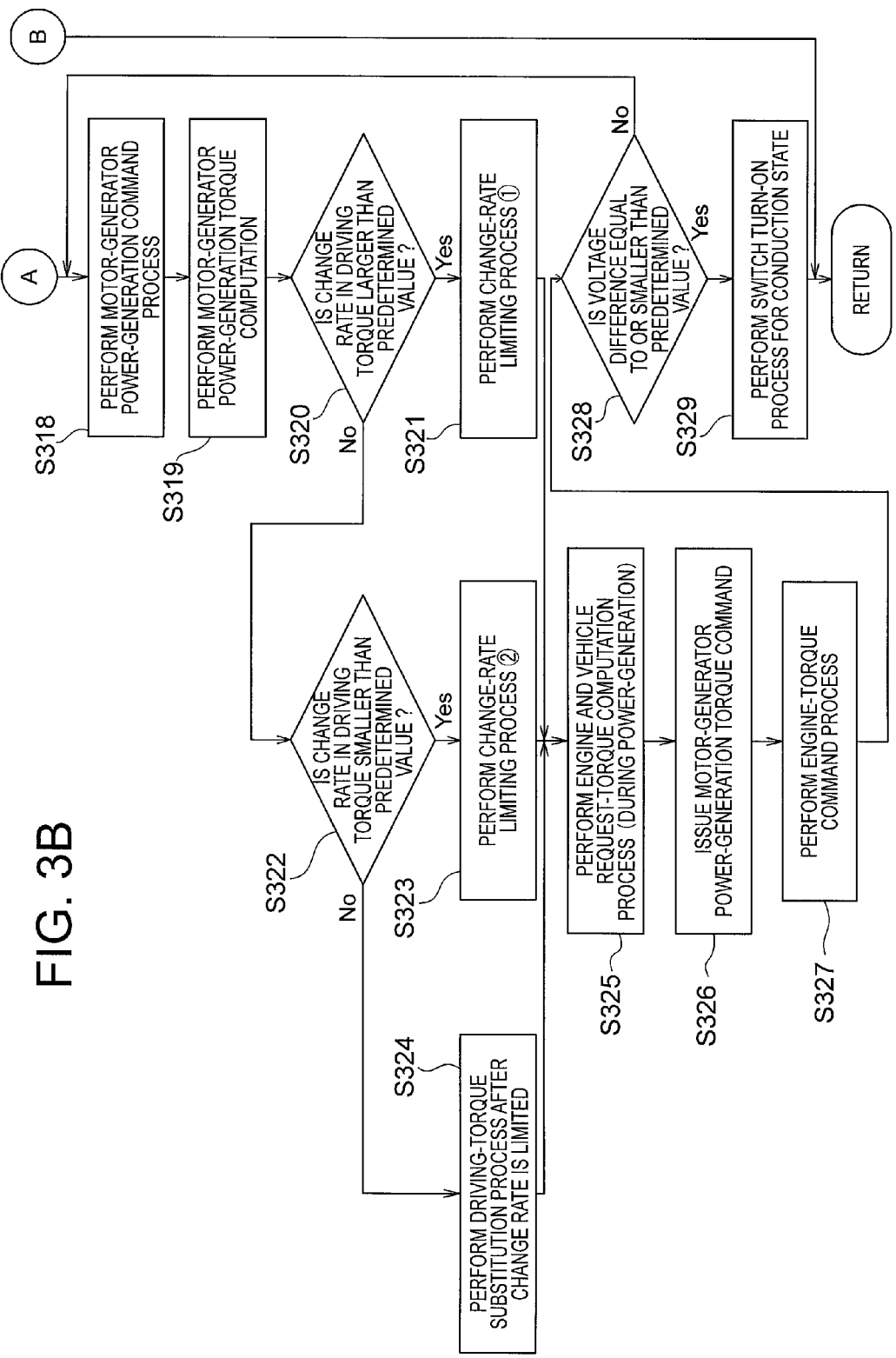
FIG. 3B is another flowchart illustrating the flow of processing performed by the power management apparatus according to the first embodiment of the present invention.

FIGS. 3A and 3B are flowcharts showing an operation of the power management section 7 according to the first embodiment of the present invention. FIGS. 3A and 3B are two flowcharts showing one continuous flow and therefore, the part shown in FIG. 3A and the part shown in FIG. 3B are continuous.

As shown in FIG. 3A, the power management section 7 first determines in Step S301 whether or not the failure has occurred in the power converter 4. The occurrence of the failure is determined when the output current of the power converter 4 is equal to or smaller than a predetermined value although the terminal-voltage of the first electric power storage device 1 is equal to or larger than the predetermined value and therefore, the power converter 4 is in a drivable state. Then, processing proceeds to Step S302. When it is not determined that the failure has occurred in the power converter 4, the processing is terminated.

In Step S302, the power management section 7 commands the motor-generator 3 to inhibit a normal power-generation operation. Then, the processing proceeds to Step S303.

In Step S303, the power management section 7 commands the engine controller 14 to inhibit the idling stop. Then, the processing proceeds to Step S304.

In Step S304, the power management section 7 starts processing of lowering the inter-terminal voltage of the first electric power storage device 1 (In FIG. 3A, the first electric power storage device 1 is shown as "FIRST EPSD"). The power management section 7 sets a value obtained by subtracting the maximum value D1 of the voltage drop occurring between the motor-generator 3 and the first electric power storage device (the first EPSD) 1 while the motor-generator 3 is driven from the inter-terminal voltage of the second electric power storage device 2 to the first target voltage T1 and then, determines whether or not the inter-terminal voltage of the first electric power storage device (the first EPSD) 1 is equal to or smaller than the first target voltage T1. When the inter-terminal voltage of the first electric power storage device (the first EPSD) 1 is equal to or smaller than the first target voltage T1, the processing proceeds to Step S318 shown in FIG. 3B. On the other hand, when the inter-terminal voltage of the first electric power storage device (the first EPSD) 1 is higher than the first target voltage T1, the processing proceeds to Step S305.

In Step S305, the power management section 7 commands to drive the motor-generator 3. Then, the processing proceeds to Step S306.

In Step S306, the power management section 7 computes the driving torque of the motor-generator 3 by a lookup table having the engine rpm as an argument. Then, the processing proceeds to Step S307. The lookup table is prestored in the power management section 7. In the lookup table, the driving torque of the motor-generator 3 is set and stored for each engine rpm.

In Step S307, the power management section 7 limits the driving torque of the motor-generator 3, which is computed in Step S306, by a value obtained by multiplying an absolute value of a value obtained by subtracting the first target voltage T1 from the inter-terminal voltage V1 of the first electric power storage device 1 by a constant k1 (k1×|V1−T1|; here, k1 is constant). Then, the processing proceeds to Step S308.

In Step S308, the power management section 7 determines whether or not the change amount in driving torque of the motor-generator 3, which is limited in Step S307, is larger than a predetermined change amount. Specifically, it is determined whether or not a value obtained by subtracting the driving torque (previous value) of the motor-generator 3 from the driving torque (current value) of the motor-generator 3, which is limited in Step S307, is larger than the predetermined change amount, as expressed by the following expression.

(Driving torque (current value) of the motor-generator 3)−(Driving torque (previous value) of the motor-generator 3)>(Predetermined change amount)

When the expression described above is satisfied as a result of determination, the processing proceeds to Step S309. If not, the processing proceeds to Step S310.

In Step S309, the power management section 7 sets a limit as expressed by the following expression so that the change amount in driving torque of the motor-generator 3, which is limited in Step S307, becomes equal to or smaller than the predetermined change amount. Then, the processing proceeds to Step S313.

(Driving torque of the motor-generator 3 after the change amount is limited)=(Driving torque (previous value) of the motor-generator 3)+(Predetermined change amount)

On the other hand, in Step S310, the power management section 7 determines whether or not the change amount in driving torque of the motor-generator 3, which is limited in Step S307, is smaller than the predetermined change amount, as expressed by the following expression.

(Driving torque of the motor-generator 3, limited in Step S307)−(Driving torque (previous value) of the motor-generator 3)<(−1)×(Predetermined change amount)

When the expression described above is satisfied, the processing proceeds to Step S311. If not, the processing proceeds to Step S312.

In Step S311, the power management section 7 sets a limit as expressed by the following expression so that the change amount in driving torque of the motor-generator 3, which is limited in Step S307, becomes equal to or larger than the predetermined change amount. Then, the processing proceeds to Step S313.

(Driving torque of the motor-generator 3 after the change amount is limited)=(Driving torque (previous value) of the motor-generator 3)−(Predetermined change amount)

In Step S312, the power management section 7 performs a substitution process of the driving torque of the motor-generator 3 after the change amount is limited, as expressed by the following expression. Then, the processing proceeds to Step S313.

(Driving torque of the motor-generator 3 after the change amount is limited)=(Driving torque of the motor-generator 3, limited in Step S307)

In Step S313, the power management section 7 computes a request torque of the vehicle from a lookup table having the engine rpm and the accelerator opening-degree as arguments. Then, the processing proceeds to Step S314. The lookup table is prestored in the power management section 7. In the lookup table, the request torque of the vehicle is set and stored for each engine rpm and each accelerator opening-degree.

In Step S314, the power management section 7 issues the command for the driving torque of the motor-generator 3 after the change amount is limited, which is computed in the steps up to Step S313, to the motor-generator 3. Then, the processing proceeds to Step S315.

In Step S315, the power management section 7 subtracts the driving torque of the motor-generator 3 after the change amount is limited, which is commanded in Step S314, from the request torque of the vehicle, which is computed in Step S313, to calculate a request torque of the engine. After the power management section 7 issues a command for the calculated request torque of the engine to the engine controller 14, the processing proceeds to Step S316.

In Step S316, the power management section 7 determines whether or not the request torque of the engine, which is calculated in Step S315, is a predetermined value or smaller. When the request torque of the engine is equal to or smaller than the predetermined value, the processing proceeds to Step S317. On the other hand, when the request torque of the engine is larger than the predetermined value, the processing returns to Step S304.

In Step S317, the power management section 7 commands the engine controller 14 to stop the fuel injection. Then, the processing returns to Step S304.

On the other hand, in Step S318 shown in FIG. 3B, the power management section 7 commands the motor-generator 3 to generate power. Then, the processing proceeds to Step S319.

In Step S319, the power management section 7 sets the inter-terminal voltage of the second electric power storage device 2 to the second target voltage T2. Thereafter, a value obtained by multiplying an absolute value of a value obtained by subtracting the inter-terminal voltage V1 of the first electric power storage device 1 from the second target voltage T2 by a constant (k2×|T2−V1|; here, k2 is a constant) is set as the power-generation torque of the motor-generator 3. Then, the processing proceeds to Step S320.

In Step S320, the power management section 7 determines whether or not the change amount in power-generation torque of the motor-generator 3, which is computed in Step S319, is larger than the predetermined change amount, as expressed by the following expression.

(Power-generation torque of the motor-generator 3, computed in Step S319)−(Power-generation torque (previous value) of the motor-generator 3)>(Predetermined change amount)

When the expression described above is satisfied as a result of determination, the processing proceeds to Step S321. If not, the processing proceeds to Step S322.

In Step S321, the power management section 7 sets a limit as expressed by the following expression so that the change amount in power-generation torque of the motor-generator 3, which is limited in Step S319, becomes equal to or smaller than the predetermined change amount. Then, the processing proceeds to Step S325.

(Power-generation torque of the motor-generator 3 after the change amount is limited)=(Power-generation torque (previous value) of the motor-generator 3)+(Predetermined change amount)

On the other hand, in Step S322, the power management section 7 determines whether or not the change amount in power-generation torque of the motor-generator 3, which is computed in Step S319, is smaller than the predetermined change amount, as expressed by the following expression.

(Power-generation torque of the motor-generator 3, computed in Step S319)−(Power-generation torque (previous value) of the motor-generator 3)<(−1)×(Predetermined change amount)

When the expression described above is satisfied as a result of determination, the processing proceeds to Step S323. If not, the processing proceeds to Step S324.

In Step S323, the power management section 7 sets a limit as expressed by the following expression so that the change amount in power-generation torque of the motor-generator 3, which is computed in Step S319, becomes equal to or larger than the predetermined change amount. Then, the processing proceeds to Step S325.

(Power-generation torque of the motor-generator 3 after the change amount is limited)=(Power-generation torque (previous value) of the motor-generator 3)−(Predetermined change amount)

In Step S324, the power management section 7 performs a substitution process of the power-generation torque of the motor-generator 3 after the change amount is limited, as expressed by the following expression. Then, the processing proceeds to Step S325.

(Power-generation torque of the motor-generator 3 after the change amount is limited)=(Power-generation torque of the motor-generator 3, computed in Step S319)

In Step S325, the power management section 7 computes the request torque of the vehicle by a lookup table having the engine rpm and the accelerator opening-degree as arguments, and then adds the power-generation torque of the motor-generator 3 after the change amount is limited, which is computed in the steps up to the previous step, to the computed request torque to obtain the result of addition as the request torque of the engine. Then, the processing proceeds to Step S326.

In Step S326, the power management section 7 issues the command for the power-generation torque of the motor-generator 3 after the change amount is limited to the motor-generator 3. Then, the processing proceeds to Step S327.

In Step S327, the power management section 7 issues a command for the request torque of the engine, which is calculated in Step S325, to the engine controller 14. Then, the processing proceeds to Step S328.

In Step S328, the power management section 7 determines whether or not a difference between the inter-terminal voltage of the first electric power storage device 1 and the inter-terminal voltage of the second electric power storage device 2 is equal to or smaller than a predetermined value. When the difference between the inter-terminal voltage of the first electric power storage device 1 and the inter-terminal voltage of the second electric power storage device 2 is equal to or smaller than the predetermined value, the processing proceeds to Step S329. On the other hand, when the difference between the inter-terminal voltage of the first electric power storage device 1 and the inter-terminal voltage of the second electric power storage device 2 is larger than the predetermined value, the processing proceeds to Step S318 and is continued.

In Step S329, the power management section 7 commands the switch 6 to be operated to switch the state between the high-voltage circuit and the low-voltage circuit from the non-conduction state to the conduction state. Then, the processing is terminated.

The embodiment of the present invention has been described above. However, any configuration can be used as long as the switch 6 can be turned ON so as to achieve the conduction state between the first electric power storage device 1 and the second electric power storage device 2 when the voltage difference between the inter-terminal voltage of the first electric power storage device 1 and the inter-terminal voltage of the second electric power storage device 2 is equal to or smaller than the predetermined value, and the present invention is not limited to the configuration described in the embodiment of the present invention.

As described above, the present invention relates to the power management system including the first electric power storage device 1, the second electric power storage device 2, the power converter 4 for converting the power of the first electric power storage device 1 so as to supply the converted power to the second electric power storage device 2 and the electric apparatuses 5 of the vehicle, the motor-generator 3 which is connected to the first electric power storage device 1 and uses the power of the first electric power storage device 1 to apply the torque to the exterior or generate power by the external torque so as to charge the first electric power storage device 1, the switch 6 connected between the circuit including the first electric power storage device 1 and the circuit including the second electric power storage device 2 so as to bring the non-conduction state into the conduction state between the circuits when the failure of the power converter 4 occurs, and the power management section 7 for operating the motor-generator 3 so that the voltage difference between the first electric power storage device 1 and the second electric power storage device 2 becomes equal to or smaller than the predetermined voltage before the switch 6 is operated to switch the state between the circuits from the non-conduction state to the conduction state. The present invention also relates to the power management apparatus including the power management section 7 including the inter-terminal voltage detecting means 8 for the first electric power storage device 1 and the inter-terminal voltage detecting means 9 for the second electric power storage device 2, and the switch 6. The power-converter output-current detecting means 10 may also be included as a component of the power management apparatus. Further, the present invention also relates to the power management method carried out in any one of the power management apparatus and the power management system.

According to the present invention, when the failure occurs in the power converter 4, the switch 6 provided between the high-voltage circuit and the low-voltage circuit is configured to be operated so that the state between the high-voltage circuit and the low-voltage circuit is switched from the non-conduction state to the conduction state. Therefore, even when the failure occurs in the power converter 4, the power generated by the motor-generator 3 can be supplied to the electric apparatuses 5 of the vehicle through an intermediation of the switch 6. Accordingly, the vehicle can continue running in a stable manner without stopping the electric apparatuses 5 of the vehicle. Moreover, the power management apparatus and the power management system can be configured in small size at low cost as compared with the case where the dual-system configuration is used because the switch 6 is just additionally provided. Further, the switch 6 is operated to achieve the conduction state after the voltage difference between the high-voltage circuit and the low-voltage circuit becomes equal to or smaller than the predetermined value. Therefore, the voltage of the low-voltage circuit is not increased. As a result, the voltage of the low-voltage circuit is prevented from exceeding the withstand voltage of the electric apparatuses 5 of the vehicle, thereby preventing the occurrence of burnout.

When the voltage difference between the inter-terminal voltage of the first electric power storage device 1 and the inter-terminal voltage of the second electric power storage device 2 is equal to or larger than the predetermined voltage difference, the motor-generator 3 is operated in the driving state in which the torque is applied to the exterior. As a result, the torque can be applied to the engine. Thus, the voltage can be quickly lowered without unnecessarily consuming the energy stored in the first electric power storage device 1. As a result, a time period in which the power is not supplied to the low-voltage circuit can be minimized. While the motor-generator 3 is driven, a large current flows through the high-voltage circuit. Therefore, a voltage drop occurs due to a wiring resistance to prevent the inter-terminal voltage of the first electric power storage device 1 from being precisely measured. Therefore, the driving state of the motor-generator 3 is continued until the inter-terminal voltage of the first electric power storage device 1 becomes equal to or smaller than the first target voltage T1 smaller than the inter-terminal voltage of the second electric power storage device 2. When the voltage reaches the first target voltage T1, the operation state of the motor-generator 3 is switched to that in the power-generation state so that the power is generated until the voltage difference between the inter-terminal voltage of the first electric power storage device 1 and the inter-terminal voltage of the second electric power storage device 2 becomes equal to or smaller than the predetermined value. Then, the switch 6 is turned ON to switch the state between the high-voltage circuit and the low-voltage circuit from the non-conduction state to the conduction state. As a result, the inter-terminal voltage of the first electric power storage device 1 is measured with good accuracy while the motor-generator 3 operates in the driving state. In addition, after the operation of the motor-generator 3 is switched to that in the power-generation state, the inter-terminal voltage is brought to be closer to the voltage of the second electric power storage device 2. Therefore, the voltage difference at the time of the switching operation of the switch 6 can be more precisely obtained. The possibility of applying a high voltage to the low-voltage circuit can be reduced as compared with the case where the voltage is measured while the motor-generator 3 operates in the driving state.

Further, while the motor-generator 3 is driven, the torque output by the engine is reduced according to the magnitude of the torque which is generated by the motor-generator 3 when the motor-generator 3 is driven. As a result, when the motor-generator 3 is driven to lower the inter-terminal voltage of the first electric power storage device 1, the torque output by the engine can be reduced by the amount of the driving torque of the motor-generator 3. Accordingly, the amount of fuel consumed by the engine can be reduced.

While the motor-generator 3 is driven, control is performed so that the sum of the driving torque of the motor-generator 3 and the driving torque of the engine becomes identical with the torque requested by the vehicle. If the motor-generator 3 is driven in a simple manner, the sum of the driving torque of the motor-generator 3 and the output torque of the engine is disadvantageously output from the output shaft of the engine to result in the generation of a fluctuation in torque. In the manner described above, the torque requested by the vehicle and the torque of the output shaft of the engine, including the output torque of the motor-generator 3, become equal to each other regardless of the driving of the motor-generator 3. Therefore, the generation of a fluctuation in torque can be suppressed.

Moreover, when the output torque of the engine becomes equal to or smaller than the predetermined torque while the motor-generator 3 is driven, the fuel supply to the engine is stopped. As a result, when the torque necessary to maintain the rotation of the engine is smaller than the maximum output torque of the motor-generator 3, the fuel injection can be stopped to reduce the amount of fuel consumed by the engine to zero.

Further, control is performed so that a change in any one of the driving torque generated by the motor-generator 3 and the power-generation torque becomes equal to or smaller than the predetermined value after the failure of the power converter 4 is detected until the switch 6 is operated to switch the non-conduction state between the high-voltage circuit and the low-voltage circuit to the conduction state. In this manner, the fluctuation in torque of the engine connected on the power shaft of the motor-generator 3 can be reduced.

What is claimed is:

1. A power management apparatus provided in a vehicle including:
   a first circuit including a first electric power storage device; a second circuit including a second electric power storage device; a power converter for converting power of the first electric power storage device to supply the converted power to the second electric power storage device and an electric apparatus of the vehicle; and a motor-generator connected to the first electric power storage device, the power management apparatus comprising:
   a switch connected between the first circuit and the second circuit and provided separately from the power converter, for bringing a state between the first circuit and the second circuit into a non-conduction state during a normal operation of the power converter and switching the state between the first circuit and the second circuit from the non-conduction state to a conduction state when a failure of the power converter is detected; and
   a power management section for controlling the motor-generator so that a difference between a voltage of the first electric power storage device and a voltage of the second electric power storage device is equal to or smaller than a first predetermined voltage difference before the switch is operated to switch the state between the first circuit and the second circuit from the non-conduction state to the conduction state.

2. A power management apparatus according to claim 1, wherein the power management section operates the motor-generator in a driving state in which the power of the first electric power storage device is used to apply a torque to exterior when the difference between the voltage of the first electric power storage device and the voltage of the second electric power storage device is equal to or larger than a second predetermined voltage difference.

3. A power management apparatus according to claim 2, wherein the power management section is configured to:
   allow the motor-generator to continue operating in the driving state until the voltage of the first electric power storage device becomes equal to or smaller than a target voltage smaller than the voltage of the second electric power storage device;

switch the operation of the motor-generator to an operation in a power-generation state for generating power in response to an external torque to charge the first electric power storage device and allow the motor-generator to continue operating in the power-generation state when the voltage of the first electric power storage device becomes equal to the target voltage; and operate the switch to switch the state between the first circuit and the second circuit from the non-conduction state to the conduction state when the difference between the voltage of the first electric power storage device and the second electric power storage device becomes equal to or smaller than the first predetermined voltage difference.

4. A power management apparatus according to claim 2, wherein the power management section performs control so that a torque output from an engine of the vehicle becomes smaller in accordance with a magnitude of the torque generated by the motor-generator when the motor-generator is driven, while the motor-generator operates in the driving state.

5. A power management apparatus according to claim 4, wherein the power management section performs control so that a sum of a driving torque of the motor-generator and a driving torque of the engine becomes equal to a torque requested by the vehicle while the motor-generator operates in the driving state.

6. A power management apparatus according to claim 4, wherein the power management section stops fuel supply to the engine when the output torque of the engine becomes equal to or smaller than a predetermined torque while the motor-generator operates in the driving state.

7. A power management apparatus according to claim 1, wherein the power management section performs control so that a change in any one of a driving torque generated by the motor-generator and a power-generation torque falls within a predetermined range after the detection of the failure of the power converter until the switch is operated to switch the state between the first circuit and the second circuit from the non-conduction state to the conduction state.

8. A power management system, comprising:
a first circuit including a first electric power storage device;
a second circuit including a second electric power storage device;
a power converter for converting power of the first electric power storage device to supply the converted power to the second electric power storage device and an electric apparatus of a vehicle;
a motor-generator connected to the first electric power storage device;
a switch connected between the first circuit and the second circuit and separately provided from the power converter, for bringing a state between the first circuit and the second circuit into a non-conduction state during a normal operation of the power converter and switching the state between the first circuit and the second circuit from the non-conduction state to a conduction state when a failure of the power converter is detected; and a power management section for controlling the motor-generator so that a difference between a voltage of the first electric power storage device and a voltage of the second electric power storage device is equal to or smaller than a first predetermined voltage difference before the switch is operated to switch the state between the first circuit and the second circuit from the non-conduction state to the conduction state.

9. A power management method carried out in a vehicle including:
a first circuit including a first electric power storage device;
a second circuit including a second electric power storage device; a power converter for converting power of the first electric power storage device to supply the converted power to the second electric power storage device and an electric apparatus of the vehicle; and a motor-generator connected to the first electric power storage device, the power management method comprising:
operating a switch provided between the first circuit and the second circuit and separately provided from the power converter to achieve a non-conduction state between the first circuit and the second circuit while the power converter operates normally;
detecting a failure of the power converter when the failure occurs in the power converter;
controlling the motor-generator so that a difference between a voltage of the first electric power storage device and a voltage of the second electric power storage device becomes equal to or smaller than a first predetermined voltage difference when the failure is detected; and
operating the switch to switch the state between the first circuit and the second circuit from the non-conduction state to a conduction state when the difference between the voltage of the first electric power storage device and the voltage of the second electric power storage device becomes equal to or smaller than the first predetermined voltage difference.

10. The power management apparatus according to claim 1, wherein the first predetermined voltage difference is set to a maximum voltage drop that occurs between the moto-generator and the first electric power storage device while the motor-generator is driven, and the power management section measures and prestores the maximum voltage drop in the power management section, and computes a first target voltage based on the maximum voltage drop for controlling a voltage between terminals of the first electric power storage device.

11. The power management apparatus according to claim 10, wherein the power management section operates the motor-generator to increase a driving torque of the motor generator until the voltage between the terminals of the first electric power storage device is equal to or smaller than the first target voltage.

12. The power management apparatus according to claim 1, the power management section is configured to maintain the state of the switch to be in the non-conduction state until the difference between the voltage of the first electric power storage device and the voltage of the second electric power storage device is equal to or smaller than the first predetermined voltage.

* * * * *